United States Patent [19]

Dougherty et al.

[11] 4,212,287
[45] Jul. 15, 1980

[54] INSOLATION INTEGRATOR

[75] Inventors: John J. Dougherty, Norristown; George T. Rudge, Lansdale, both of Pa.

[73] Assignee: General Electric Company, Philadelphia, Pa.

[21] Appl. No.: 936,626

[22] Filed: Aug. 24, 1978

[51] Int. Cl.² .................. F24J 3/02; H01L 31/00; H01J 39/12
[52] U.S. Cl. .................. 126/419; 126/432; 126/435; 126/437; 136/89 P; 250/206; 250/564; 250/565
[58] Field of Search ............... 126/271, 270, 419, 432, 126/435, 437; 237/1 A; 136/89 P, 89 R; 250/206, 564, 565

[56] References Cited
U.S. PATENT DOCUMENTS

| 3,993,041 | 11/1976 | Diggs | 126/271 |
|---|---|---|---|
| 4,019,495 | 4/1977 | Frazier et al. | 126/271 |
| 4,034,912 | 7/1977 | Hayes | 237/1 A |
| 4,061,132 | 12/1977 | Ashton et al. | 126/271 |
| 4,102,328 | 7/1978 | Stiff | 273/1 A |
| 4,116,219 | 9/1978 | Nurnberg | 126/271 |
| 4,125,107 | 11/1978 | Nurnberg | 237/1 A |
| 4,147,157 | 4/1979 | Zakhariya | 126/271 |

Primary Examiner—James C. Yeung
Assistant Examiner—Daniel J. O'Connor
Attorney, Agent, or Firm—Allen E. Amgott; Raymond H. Quist

[57] ABSTRACT

An electric signal representative of the rate of insolation is integrated to determine if it is adequate for operation of a solar energy collection system.

4 Claims, 2 Drawing Figures

INSOLATION INTEGRATOR

BACKGROUND OF THE INVENTION

This invention relates generally to solar collector systems and more particularly to controls for such systems.

Solar collector systems differ in complexity, but almost all require some type of control. It is desirable for example to start circulation of the liquid to be heated when the insolation is adequate. In a system employing a water/ethylene glycol mixture as the heat transfer liquid, provision must also be made to prevent over heating of the liquid which will cause it to break down. Such over heating can occur in two ways; first, if an insufficient amount of the energy collected is being utilized, the temperature of the liquid will rise; and second, if the pump circulating the liquid should stop, for example because of loss of electric power, the liquid in the collector will become over heated.

An additional problem is excessive starting and stopping of the circulating pump. This can happen if a temperature sensor indicates the collector is hot, so the pump starts; but the cool liquid flowing through it cools it down enough so that the temperature sensor indicates the collector is cool and the pump stops.

Consequently, the system and its controls should incorporate features which avoid these problems.

SUMMARY OF THE INVENTION

A solar energy collection system is operated only when insolation is adequate by producing a signal representative of the rate of insolation and integrating it.

DESCRIPTION OF THE PREFERRED EMBODIMENT

Figure 1:
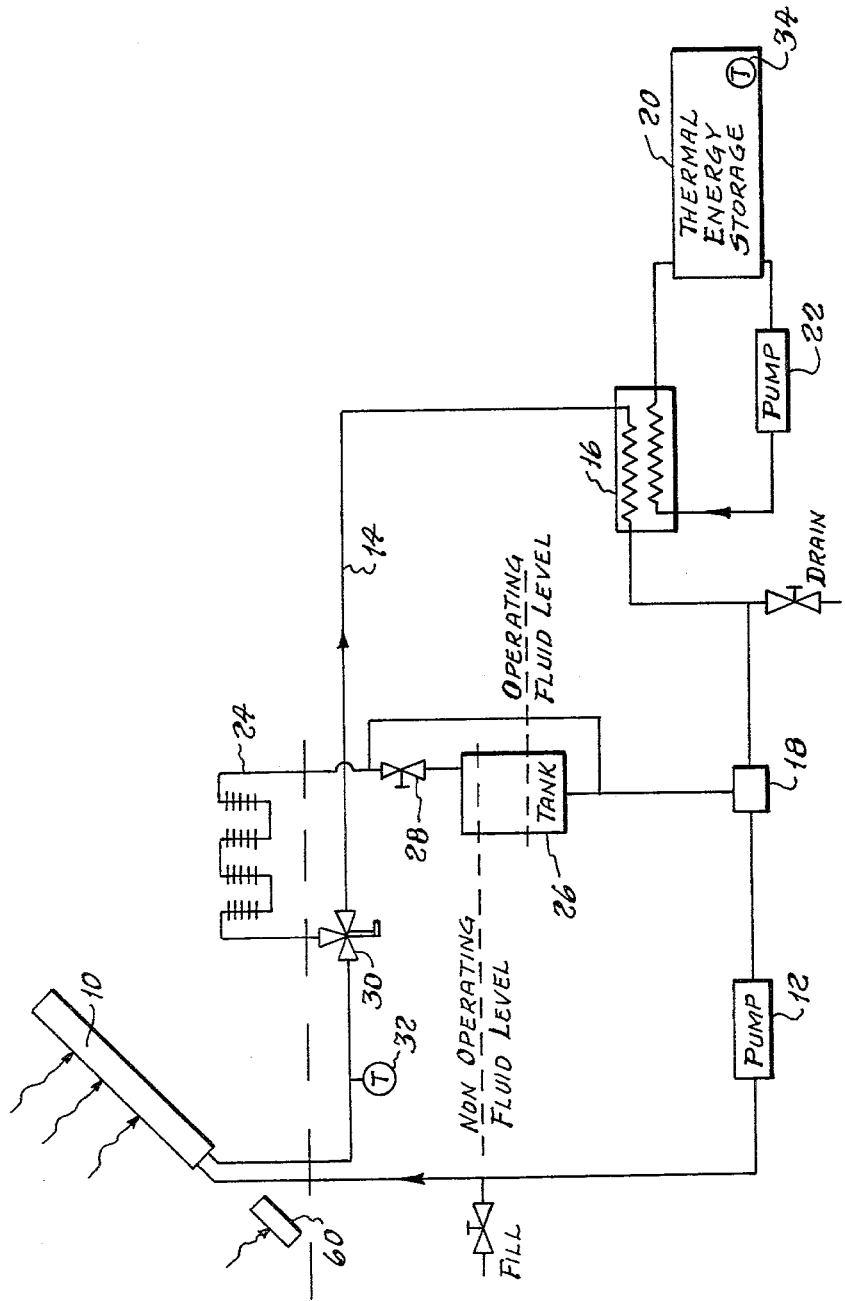
FIG. 1 is a schematic of a solar energy collection system.

Referring to FIG. 1, solar collector 10 heats a water-/ethylene glycol mixture which is caused to flow through it by pump 12. The heated liquid passes through line 14 to heat exchanger 16 and back to pump 12 after passing through air separator 18. In this embodiment a separate system employing thermal energy storage 20 and pump 22 is employed in connection with heat exchanger 16. In some systems it may be preferred to provide a heat exchange element directly in thermal energy storage 20.

When the collector system is not operating, the liquid drains from solar collector 10 through radiator 24 and into tank 26. Valve 28 is spring loaded to be in an open position and two way valve 30 is spring loaded to divert liquid through radiator 24. All the liquid in the system will then be below the NON OPERATING FLUID LEVEL indicated in FIG. 1. In starting up the system, pump 12 is first activated and causes fluid to displace the air contained in solar collector 10, radiator 24, and the conduits. After a short interval (about two minutes in the preferred embodiment) valve 30 is changed to by-pass radiator 24, and at the same time pump 22 is started to heat the water in the thermal energy storage.

Temperature sensors 32 and 34 are provided for over temperature protection. If either temperature sensor senses an over temperature condition, valve 30 is moved to divert the liquid flow through radiator 24; and pump 22 is stopped. Heat from the liquid; consequently, is radiated out from radiator 24 and conducted to the ambient air by the fins on the tubing on radiator 24.

If loss of power occurs, pump 12 will cease operating, valve 30 will move through its spring action to divert liquid through radiator 24, and valve 28 through its spring action will open. The liquid will boil out of the system and into tank 26. Through a system to be described, a return of power will not restart the system until a period of unbroken darkness passes (in the preferred embodiment approximately 13½ minutes). This effectively keeps the system shut down until the following day and prevents the introduction of relatively cool liquid into an excessively hot solar collector.

Figure 2:
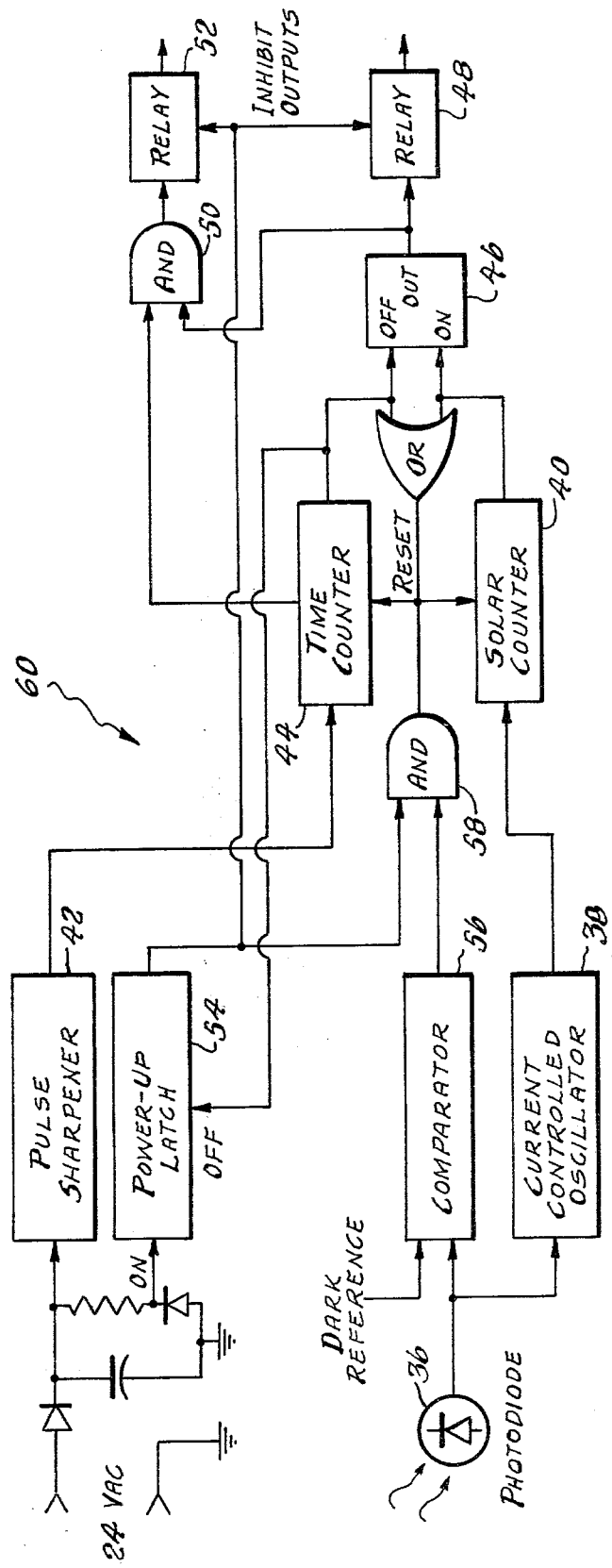
FIG. 2 is a schematic of the control circuitry of the invention.

Referring now to FIG. 2, photodiode 36 produces an electric current, the magnitude of which is directly proportional to the insolation. Photodiode 36 is positioned so as to have an unobstructed view of the sun. Photodiode 36 is connected to current controlled oscillator 38, which oscillates faster as the current increases. The pulses produced by current controlled oscillator 38 are counted by solar counter 40.

A 60 Hz 24 volt supply is connected through a diode to pulse sharpener 42. These pulses are counted by time counter 44. Time counter 44 is selected to have a capacity which will produce an output signal after a suitable elapsed time of, say 10 to 15 minutes. If solar counter 40 produces an output signal before time counter 44 (an indication that insolation is sufficient) an ON signal is delivered to latch 46 which actuates relay 48. Relay 48 turns on pump 12 (FIG. 1). The ON output of latch 46 is also present on one input of AND gate 50.

If time counter 44 produces its output before solar counter 40 (an indication of insufficient insolation) an OFF signal is delivered to latch 46. The OFF output of latch 46 is applied to one input of AND gate 50.

When either solar counter 40 or time counter 44 produces an output signal, a reset signal is delivered through OR gate 52 setting both counters back to zero.

Time counter 44 is also set to deliver an output signal to the second input of AND gate 50. This signal occurs about two minutes after time counter 44 starts counting. If an ON signal is present on the other input to AND gate 50, relay 52 starts pump 22 and moves valve 30 (FIG. 1) so that liquid no longer passes through radiator 24.

Thus in normal operation the system is shut down during the night and time counter 44 regularly produces an output signal before solar counter 40 which resets both counters. In the morning when the insolation is strong enough and sustained long enough, the solar counter pulses accumulate or integrate faster than the time counter pulses and the system starts up. As long as insolation remains adequate, the system stays on and energy is collected. When insolation reduces enough either because the sun is closer to the horizon or because the sky is overcast, time counter 44 sends on OFF signal to latch 46 which turns off relays 48 and 52.

If electric power is lost, as previously described, the liquid boils out of the system and into tank 26. When power returns, power-up latch 54 receives an ON input and produces an INHIBIT signal which is delivered to relays 48 and 52. Because of the DARK REFERENCE signal (to be described below), relays 48 and 52 will not be actuated. Power-up latch 42 must be turned off first. Time counter 44 produces an OFF signal only if it reaches its full count before solar counter 40 produces an output. Therefore if power returns while the sun is shining an OFF signal will not be delivered to power-up latch 54.

It is desired that the collectors have an opportunity to cool sufficiently so as to minimize the thermal shock which could occur when relatively cool liquid resumes flow. Even with the foregoing arrangement there is the possibility of a short storm reducing insolation sufficiently so that a OFF signal would be produced even though the collectors had not cooled down. To prevent this, comparator 56 is provided a voltage identified as DARK REFERENCE which will normally be lower than that produced by photodiode 36 under reduced insolation conditions. The output of comparator 56 is then applied to AND gate 58 together with the output of power-up latch 54 to provide a continuous RESET signal to counters 40 and 44. This prevents time counter from producing an OFF signal. Counting will only resume when photodiode 36 produces a lower voltage than the DARK REFERENCE. This will only occur when the insolation decreases to night time levels (virtually zero). Normally, the power-up latch 42 will be reset at night. When the device resumes normal operation on the following day the system has had time to cool.

Even with the foregoing it is possible that a sequence of light-dark-light of certain magnitudes could occur which would permit resumption of operation before it is desired. It should be a rare occurrence, and the present collector system can tolerate thermal shocks which occur rarely but not frequently.

As shown in FIG. 1, housing 60 containing the circuitry of FIG. 2 is preferably positioned somewhere near solar collector 10.

Although a particular embodiment of an insolation integrator has been illustrated and described, it is apparent that changes and modifications may be made without departing from the spirit of the invention and the scope of the appended claims. For example, air impelled by a blower may be used in lieu of liquid impelled by a pump.

We claim:

1. In a solar collector system wherein a fluid is circulated through a solar energy collector by a fluid impeller, a control arrangement comprising:
   insolation detector means for producing an insolation signal, the magnitude of which is proportional to the rate of the insolation;
   first pulse producing means for producing first pulses at a frequency proportional to the magnitude of said insolation signal;
   first counter means connected to receive said first pulses and to produce an output when its capacity is reached;
   second pulse producing means for producing second pulses at a fixed rate;
   second counter means connected to receive said second pulses and to produce an output when its capacity is reached;
   said first and second counter means being connected to be reset upon receiving the output pulse from either said first or second counter means; and
   actuating means responsive to an output from said first counter means to turn on said fluid impeller and responsive to an output from said second counter means to turn off said fluid impeller.

2. A solar collector system in accordance with claim 1 wherein:
   said actuating means comprises a latch for receiving an output from said first or second counters and a first relay.

3. A solar collector system in accordance with claim 2 further including:
   an and gate having as a first input the output of said latch, and as a second input of said second counter means produced prior to the output when its capacity is reached; and
   said and gate providing an output to a second relay.

4. A solar collector system in accordance with claim 1 further including:
   a power-up latch which becomes operative upon resumption of delivery of electric power after an interruption of said power and provides an inhibit signal to said first relay.

* * * * *